(12) United States Patent
Fujii (10) Patent No.: US 12,071,124 B2
(45) Date of Patent: Aug. 27, 2024

(54) WORK VEHICLE

(71) Applicant: Kubota Corporation, Osaka (JP)

(72) Inventor: Takashi Fujii, Sakai (JP)

(73) Assignee: Kubota Corporation, Osaka (JP)

( * ) Notice: Subject to any disclaimer, the term of this patent is extended or adjusted under 35 U.S.C. 154(b) by 359 days.

(21) Appl. No.: 17/529,597

(22) Filed: Nov. 18, 2021

(65) Prior Publication Data

US 2022/0348189 A1 Nov. 3, 2022

(30) Foreign Application Priority Data

Apr. 28, 2021 (JP) ................................ 2021-076500

(51) Int. Cl.
| | |
|---|---|
| *B60W 30/045* | (2012.01) |
| *B60Q 9/00* | (2006.01) |
| *B60W 40/112* | (2012.01) |
| *B62D 5/04* | (2006.01) |

(52) U.S. Cl.
CPC ............. *B60W 30/045* (2013.01); *B60Q 9/00* (2013.01); *B60W 40/112* (2013.01); *B62D 5/0463* (2013.01); *B60W 2520/10* (2013.01); *B60W 2520/12* (2013.01); *B60W 2520/14* (2013.01); *B60W 2520/16* (2013.01); *B60W 2520/18* (2013.01); *B60W 2540/18* (2013.01); *B60W 2552/15* (2020.02); *B60W 2710/207* (2013.01); *B60W 2720/10* (2013.01); *B60W 2720/12* (2013.01)

(58) Field of Classification Search
CPC ............. B60W 30/045; B60W 40/112; B60W 2552/15; B60W 2520/10; B60W 2520/12; B60W 2520/14; B60W 2520/16; B60W 2520/18; B60W 2540/18; B60W 2710/207; B60W 2720/10; B60W 2720/12; B60Q 9/00; B62D 5/0463
See application file for complete search history.

(56) References Cited

U.S. PATENT DOCUMENTS

| | | | | |
|---|---|---|---|---|
| 5,001,636 | A * | 3/1991 | Shiraishi ................ | B60K 28/16 701/41 |
| 6,547,343 | B1 * | 4/2003 | Hac ........................ | B60T 8/1755 303/146 |
| 11,597,381 | B2 * | 3/2023 | Kashiwamura ....... | B60W 10/04 |
| 2015/0096819 | A1 | 4/2015 | Grajkowski et al. | |
| 2018/0001888 | A1 * | 1/2018 | Takahara .............. | B60W 30/02 |
| 2021/0061041 | A1 * | 3/2021 | Tagami ................... | B62D 6/04 |
| 2021/0291856 | A1 * | 9/2021 | Uenoyama ............ | B60W 40/04 |
| 2022/0227387 | A1 * | 7/2022 | Ozaki ................ | G08G 1/09623 |

* cited by examiner

*Primary Examiner* — Jaime Figueroa
*Assistant Examiner* — Mohamad O El Sayah
(74) *Attorney, Agent, or Firm* — The Webb Law Firm (57) ABSTRACT

A work vehicle includes: a body; a traveling apparatus capable of a turning travel; a speed detector capable of detecting a vehicle speed; a steering tool manually operable to steer the traveling apparatus; a notification apparatus; and a controller. The controller is configured or programmed to control the traveling apparatus in response to a manual operation, with use of a travel control module; determine, based on a relationship between the vehicle speed and a steering angle of the steering tool, whether at least one of the vehicle speed and the steering angle needs to be reduced, with use of a determination module; and control the notification apparatus to give a notification of the determination by the determination module, with use of a notification module.

5 Claims, 9 Drawing Sheets

WORK VEHICLE

CROSS REFERENCE TO RELATED APPLICATION

This application claims priority to Japanese Patent Application No. 2021-076500 filed Apr. 28, 2021, the disclosure of which is hereby incorporated by reference in its entirety.

BACKGROUND OF THE INVENTION

1. Field of the Invention

The present invention relates to a work vehicle.

2. Description of the Related Art

For example, a work vehicle ("an exemplary vehicle") disclosed in the specification of U.S. Publication No. 2015/0096819 uses a speed key as a means to limit the speed of the vehicle. RFID (Radio Frequency Identifier) tag information is embedded in the speed key, and information regarding a speed limit of the work vehicle is embedded in the tag information. An RFID reader is installed in the work vehicle, and the speed limit of the work vehicle is set by reading the tag information in the speed key with the RFID reader when the engine of the work vehicle starts. That is, speed limit information is embedded in the speed key. If the work vehicle disclosed in the specification of U.S. Publication No. 2015/0096819 is shared by a plurality of operators, the speed key is distributed to each operator. If the speed limit of the work vehicle needs to be separately set for each operator in accordance with the driving skills of the operator, the information on the individual speed limits is embedded in the respective speed keys. In this case, lending, borrowing, and copying of the speed keys need to be prevented, which makes the management of the speed keys more complicated. Further, with the conventional technique disclosed in the specification of U.S. Publication No. 2015/0096819, the maximum speed of the work vehicle is uniformly limited even on a flat straight road, which may force the vehicle to travel at an unnecessarily low speed, resulting in loss of work efficiency. Moreover, with the configuration disclosed in the specification of U.S. Publication No. 2015/0096819, only the speed of the work vehicle is limited based on the information in the speed key. Thus, even if the vehicle is traveling at a low speed, the stability of turning travel may be impaired if the gravity center of a load is high or if the vehicle is steered abruptly. Therefore, there is room for improvement in terms of limiting the speed and the steering angle of the work vehicle as required. An object of the present invention is to provide a work vehicle capable of limiting the speed and the steering angle as and when required.

SUMMARY OF THE INVENTION

A work vehicle of the present invention comprises:
a body:
a traveling apparatus capable of a turning travel;
a speed detector capable of detecting a vehicle speed;
a steering tool manually operable to steer the traveling apparatus;
a notification apparatus; and
a controller configured or programmed to:
  cause a travel control module to control the traveling apparatus in response to a manual operation;
  cause a determination module to determine, based on a relationship between the vehicle speed and a steering angle of the steering tool, whether at least one of the vehicle speed and the steering angle needs to be reduced; and
  cause a notification module to control the notification apparatus to give a notification of the determination by the determination module.

According to the present invention, the determination module determines, based on the relationship between the vehicle speed and the steering angle, whether at least one of the vehicle speed and the steering angle needs to be reduced. For this reason, there is almost no concern that the work vehicle is forced to travel at an unnecessarily low speed compared with the configuration in which the maximum speed of the work vehicle is uniformly limited, thus improving work efficiency. In addition, an operator or an administrator is notified of the determination result from the determination module by the notification module. This configuration enables the operator or the administrator to reduce at least one of the vehicle speed and the steering angle during the turning travel. That is, the operator or the administrator can limit the speed and the steering angle of the work vehicle as required. Thus, a work vehicle capable of limiting the speed and the steering angle as and when required is realized.

In one preferred embodiment of the present invention, the work vehicle further comprises
  an angular velocity detector capable of detecting an angular velocity,
  wherein the controller is configured or programmed to:
    cause a calculator to calculate roll characteristics of the body based on the angular velocity and the speed that are detected through a turning travel for calculation, which is a turning travel on a flat ground; and
    cause the determination module to determine, based on the roll characteristics, whether at least one of the vehicle speed and the steering angle needs to be reduced.

According to this configuration, the angular velocity and the vehicle speed are measured through the turning travel (turning travel for calculation) of the body on a flat ground, and the roll characteristics are calculated based on the angular velocity and the vehicle speed. The determination module can then determine whether at least one of the vehicle speed and the steering angle is to be reduced during the turning travel, in accordance with the roll characteristics.

In one preferred embodiment of the present invention, in the work vehicle,
  the angular velocity detected by the angular velocity detector includes at least one of an angular velocity of a roll angle of the body, an angular velocity of a yaw angle of the body, and an angular velocity of a pitch angle of the body.

With this configuration, at least one of the three-dimensional components of the angular velocity is used to calculate the roll characteristics. Thus, a three-dimensional component can be selected as appropriate so as to improve the accuracy of roll characteristics calculation.

In one preferred embodiment of the present invention, in the work vehicle,
  the traveling apparatus includes:
    a pair of left and right front wheels at a front part of the body; and
    a pair of left and right rear wheels at a rear part of the body,
  wherein the controller is configured or programmed to:

cause the calculator to calculate the roll characteristics based on at least one of a roll stiffness of the front wheels and a roll stiffness of the rear wheels.

The degree of roll of the body varies depending on the stiffness of the body, the stiffness of the suspension that supports the wheels, and other factors. In this configuration, the roll stiffness of the front and rear wheels is used to calculate the roll characteristics. This configuration improves the accuracy of roll characteristics calculation compared with the configuration in which the roll stiffness of the front and rear wheels is not used to calculate the roll characteristics.

In one preferred embodiment of the present invention, in the work vehicle,
the calculator is a height-of-gravitational-center calculator configured to calculate a height-of-gravitational-center as the roll characteristics, based on the angular velocity and the vehicle speed detected through the turning travel for calculation.

The roll characteristics of the body varies with a change in the height-of-gravitational-center of the body. The height-of-gravitational-center is, therefore, an important factor for the determination module to perform determination processing. In this configuration, the calculator calculates the height-of-gravitational-center through the turning travel for calculation, enabling the determination module to easily perform determination based on the height-of-gravitational-center.

In one preferred embodiment of the present invention, in the work vehicle,
the controller is configured or programmed to:
cause the travel control module to execute vehicle speed control processing for reducing the vehicle speed of the traveling apparatus in response to the determination module determining that at least one of the vehicle speed and the steering angle needs to be reduced.

This configuration enables vehicle speed control before the operator performs an operation, improving ride quality for the operator during the turning travel compared with the configuration in which the travel control modules do not execute vehicle speed control processing for the traveling apparatus.

In one preferred embodiment of the present invention, the work vehicle further comprises
a steering motor applying a torque to the steering tool, wherein the controller is configured or programmed to:
cause the travel control module to drive the steering motor so as to prevent the steering tool from being steered toward a side opposite to a straight-ahead driving side in response to the determination module determining that at least one of the vehicle speed and the steering angle needs to be reduced.

In this configuration, the steering operation of the steering tool toward the opposite side to the straight-ahead driving side is suppressed by the steering motor. Thus, the operator is likely to have psychology to return the steering tool to the straight-ahead driving side or decelerating the vehicle during the turning travel.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

A preferred embodiment, which is an example of the present invention, will be hereinafter described with reference to the drawings. Note that in the following description of a traveling body of a multipurpose vehicle, the directions indicated by arrows "F", "B", "U", "D", "L", and "R" shown in FIGS. 1 and/or 2 are, respectively, a "body forward direction", a "body backward direction", a "body upward direction", a "body downward direction", a "body left direction", and a "body right direction". In the present preferred embodiment, an axis extending in the directions of the arrows "F" and "B" is a "roll axis" of the multipurpose vehicle, an axis extending in the directions of the arrows "L" and "R" is a "pitch axis", and an axis extending in the directions of the arrows "U" and "D" is a "yaw axis" of the multipurpose vehicle.

[Overall Configuration of Multipurpose Vehicle]

Figure 1:
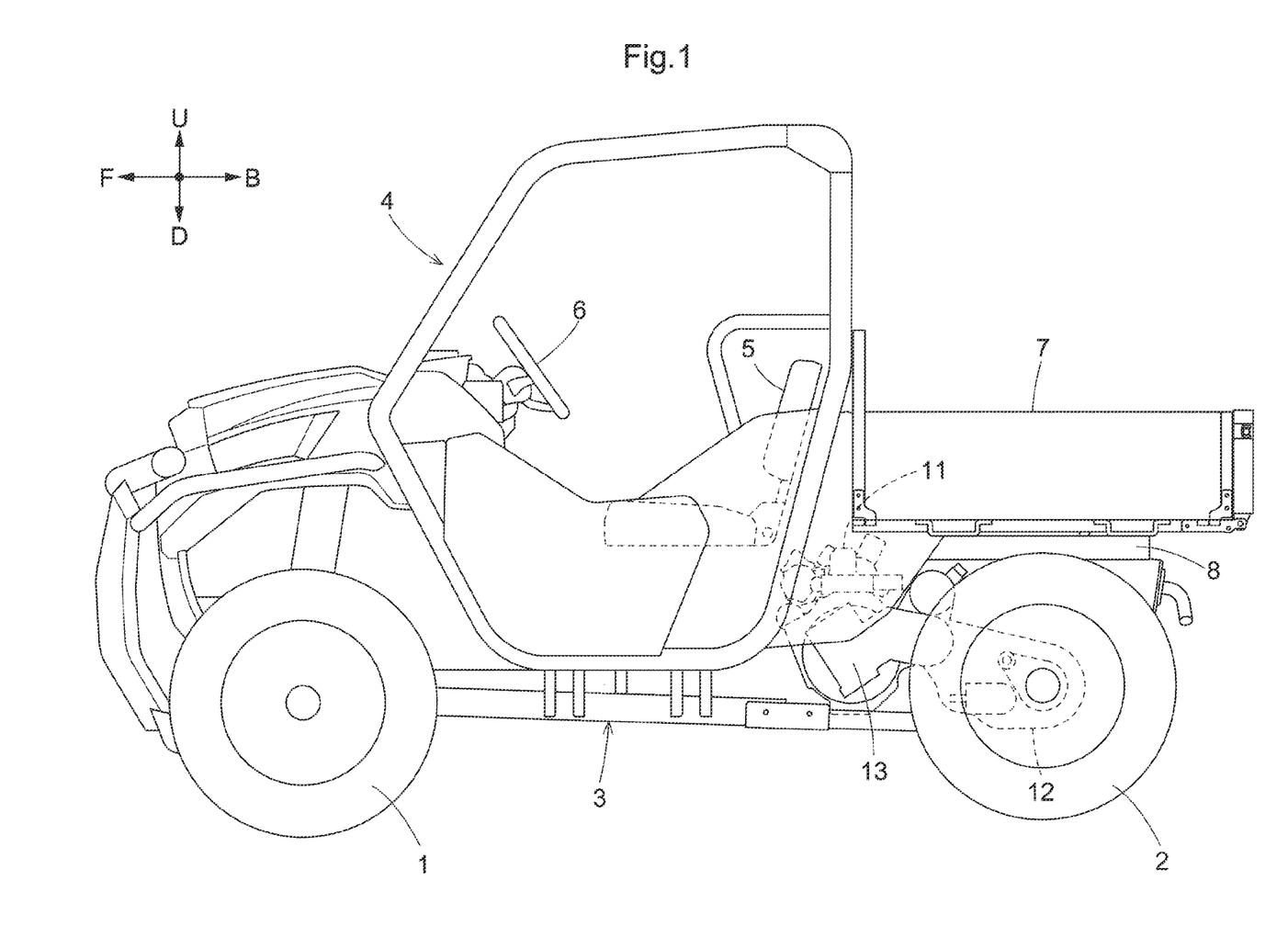
FIG. 1 is a side view of an entire multipurpose vehicle.
Figure 2:
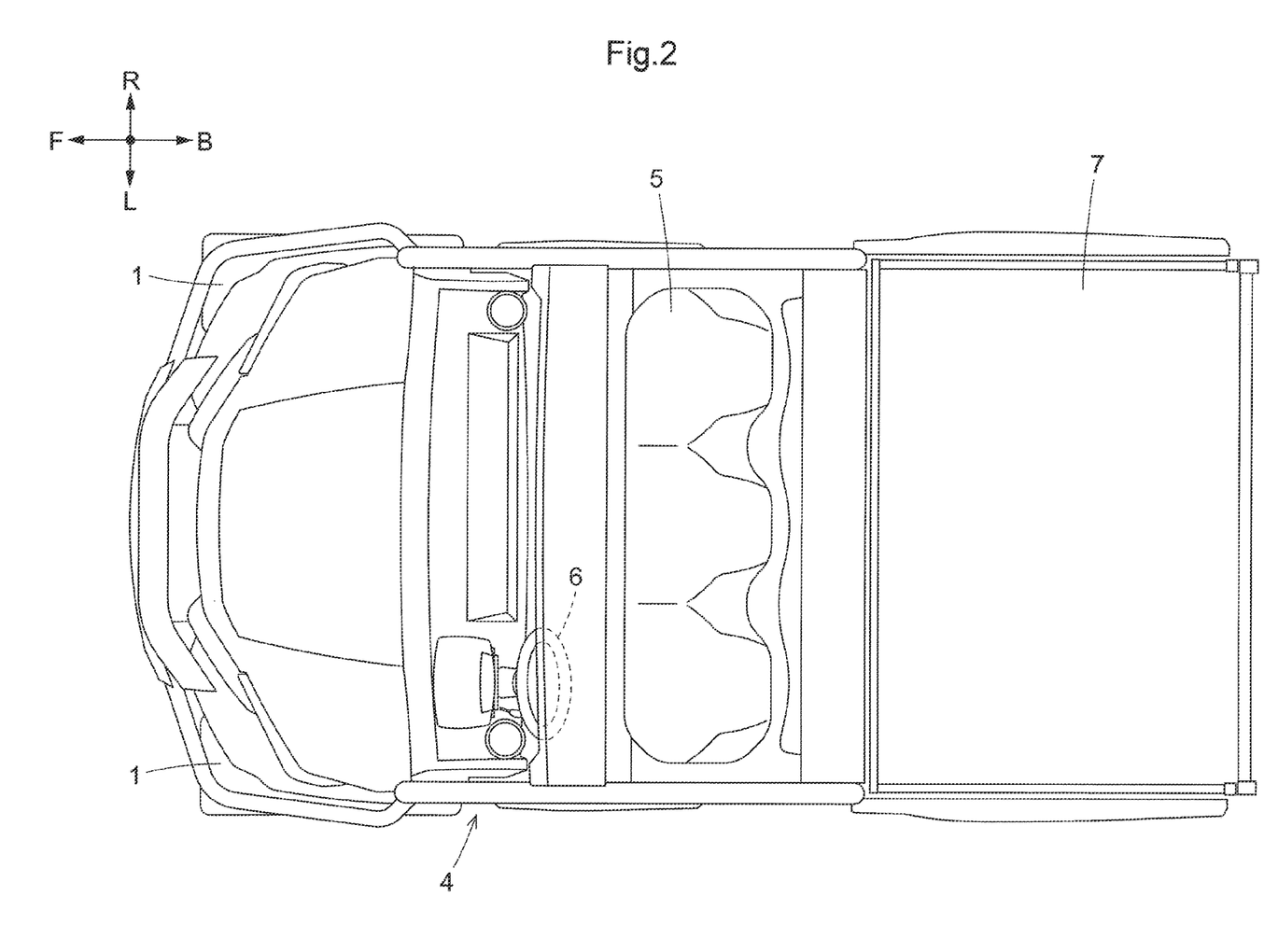
FIG. 2 is a plan view of the entire multipurpose vehicle.

As shown in FIG. 1, the multipurpose vehicle has a traveling body 3. The traveling body 3 is equipped with a pair of left and right front wheels 1 that can be steered and driven, and is also equipped with a pair of left and right rear wheels 2 that can be driven. A cab 4 is provided in an intermediate area in the front-back direction of the traveling body 3. The cab 4 includes an operator seat 5 and a steering wheel 6 for steering the front wheels 1. A carrier 7 is provided in a rear part of the traveling body 3, and is supported by body frames 8. A pair of left and right body frames 8 are provided on the body, and extend in the body front-back direction. The steering wheel 6 corresponds to a "steering tool" of the present invention.

As shown in FIGS. 1 and 2, an engine 11, a traveling transmission 12, and a continuously variable shifter 13 are provided below the carrier 7. The engine 11 is provided in a front part of the region below the carrier 7. The traveling transmission 12 is provided on the vehicle back side from the engine 11. The continuously variable shifter 13 is provided on the vehicle left side from the engine 11 and the traveling transmission 12. In the present preferred embodiment, the continuously variable shifter 13 is a continuously variable transmission (CVT), for example. The driving force of the engine 11 is transmitted to the pair of left and right front wheels 1 and the pair of left and right rear wheels 2 via the continuously variable shifter 13 and the traveling transmission 12. The pair of left and right front wheels 1, the pair of left and right rear wheels 2, the steering wheel 6, the traveling transmission 12, and the continuously variable shifter 13 correspond to a "traveling apparatus" of the present invention. The traveling apparatus may also include the engine 11. Note that the continuously variable shifter 13 may be a hydraulic static transmission (HST).

[Controller]

Figure 3:
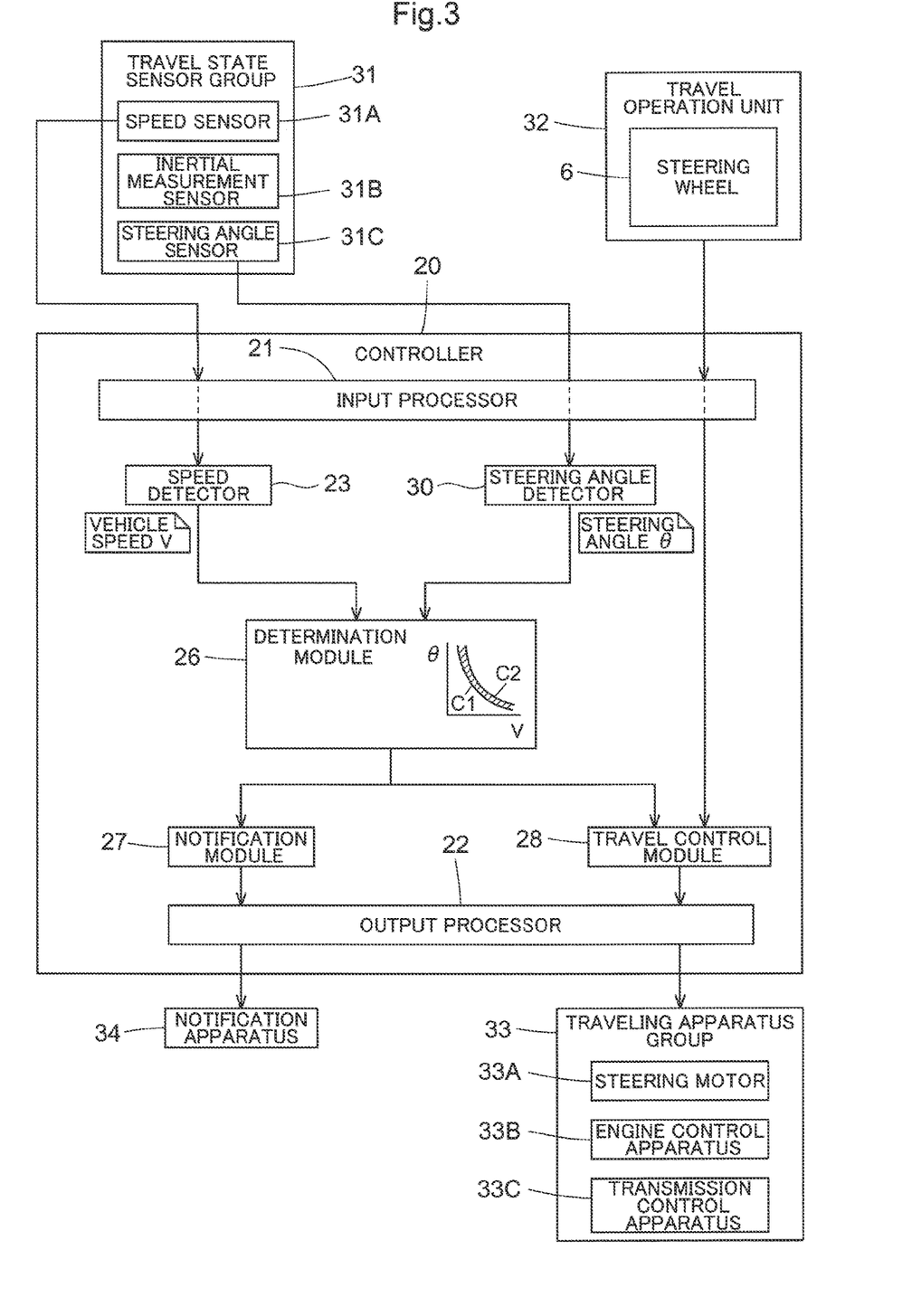
FIG. 3 is a block diagram illustrating a controller of the multipurpose vehicle.

FIG. 3 shows a control block related to a travel control system for the multipurpose vehicle. The control system of the multipurpose vehicle in the present preferred embodiment includes a large number of electronic controllers called ECUs, various operating apparatuses, sensors, switches, and a wiring network for, for example, an in-vehicle LAN for data transmission between them. The multipurpose vehicle includes a controller 20, which is a part of the control system. The controller 20 includes a storage medium such as an EEPROM, in which a determination module 26 and other modules are stored as a program.

The controller 20 includes an input processor 21 and an output processor 22 that serve as input and output interfaces. The input processor 21 is connected to a travel state sensor group 31, a travel operation unit 32 that can be operated by an operator, and so on.

The travel state sensor group 31 includes a speed sensor 31A, an inertial measurement sensor 31B, and a steering angle sensor 31C. Although not shown in the figure, the travel state sensor group 31 may also include a weight sensor, an obstacle detection sensor, an engine rotational speed sensor, a brake pedal position detection sensor, a gear change position detection sensor, a positioning apparatus such as a GNSS (Global Navigation Satellite System; e.g., GPS, QZSS, Galileo, GLONASS, BeiDou etc.), or the like. The speed sensor 31A detects, for example, the rotational speed of transmission shafts for the rear wheels 2. Alternatively, the speed sensor 31A may calculate the speed based on the positioning information of the GNSS. The transmission shafts for the rear wheels 2 are, for example, output shafts of the traveling transmission 12 or outputs shaft of the continuously variable shifter 13. The inertial measurement sensor 31B is a so-called IMU (Inertial Measurement Unit), and detects an angle (roll angle, pitch angle), an angular velocity (specifically, the angular velocity of the yaw angle), and an angular acceleration when the traveling body 3 turns or tilts. The steering angle sensor 31C detects operation amounts in the right and left directions of the steering wheel 6.

The travel operation unit 32 is a generic term of operation tools manually operated by an occupant. An operation signal based on a manual operation of the travel operation unit 32 is input to the controller 20. The travel operation unit 32 includes the steering wheel 6, an accelerator pedal (not shown), a shift lever (not shown), and so on.

The output processor 22 is connected to various apparatuses in the traveling apparatus group 33. The traveling apparatus group 33 includes, for example, a steering motor 33A, an engine control apparatus 33B for controlling the engine 11, a transmission control apparatus 33C for controlling the aforementioned continuously variable shifter 13, and so on. The steering motor 33A works on the steering wheel 6 to control the steering of the pair of left and right front wheels 1.

The output processor 22 is also connected to a notification apparatus 34. The notification apparatus 34 may be, for example, a buzzer or an audio guide, or may be a meter panel display or a screen display (liquid crystal, organic LED etc.) installed in the multipurpose vehicle. Note that the notification apparatus 34 may also give notifications of the state of the vehicle speed V, the engine rotational speed, or the like, for example.

The controller 20 includes a speed detector 23, a determination module 26, a travel control module 28, a notification module 27, and a steering angle detector 30. The speed detector 23 detects the vehicle speed V of the vehicle based on the rotational speed received from the speed sensor 31A. The vehicle speed V is sent from the speed detector 23 to the determination module 26. The steering angle detector 30 detects the steering angle θ based on the operation amount of the steering wheel 6 received from the steering angle sensor 31C. To distinguish between the left and right directions, the steering angle θ takes a value of 0 for the straight-ahead direction, a positive value for steering in either one of the left and right directions, and a negative value for steering in the other one of the left and right directions. The steering angle θ is sent from the steering angle detector 30 to the determination module 26.

The determination module 26 determines whether or not to reduce the vehicle speed V and the steering angle θ and give a notification, based on the relationship between the vehicle speed V and the steering angle θ. The notification module 27 notifies the operator of the results of determination by the determination module 26 via the notification apparatus 34. The travel control module 28 has an engine control function, a steering control function, a speed control function, and so on, and gives control signals to the traveling apparatus group 33. For example, known PID control is used as a method of controlling the output of the control signals.

As turning travel during daily practical travel, turning travel is performed on a ground. The ground may be, for example, a road, a field, a meadow, or a wasteland. While turning travel is performed, the vehicle speed V is detected by the speed detector 23, the steering angle θ is detected by the steering angle detector 30, and the determination module 26 performs determination based on the vehicle speed V and the steering angle θ.

The concept of the determination results output by the determination module 26 will be described with reference to FIG. 4. In the graph shown in FIG. 4, the horizontal axis indicates the vehicle speed V and the vertical axis indicates the steering angle θ. A target curve C1 shown in the graph indicates the acceptable steering angle θ with respect to the vehicle speed V in order to stably maintain turning behavior of the traveling body 3. In order to further stably maintain turning behavior of the traveling body 3, a margin curve C2 is shown in an area on the lower left side of the target curve C1 in the graph. The area between the target curve C1 and the margin curve C2 is a notification area.

Figure 4:
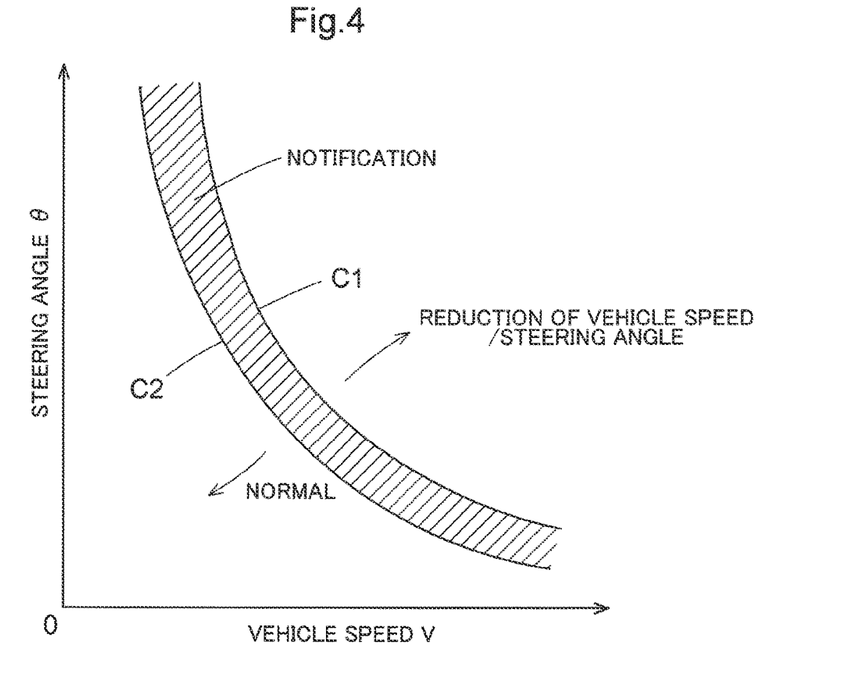
FIG. 4 is a graph illustrating determination by a determination module based on a vehicle speed/steering angle coordinate system.

In the graph in FIG. 4, if a plot point, which is an intersection of the vehicle speed V and the steering angle θ, is located on the upper right side with respect to the target curve C1, the determination module 26 determines that the steering angle θ is too large for the vehicle speed V. The determination module 26 then determines that at least either the vehicle speed V or the steering angle θ needs to be reduced.

When a plot point, which is an intersection of the vehicle speed V and the steering angle θ, is located within the notification area, the determination module 26 determines that the acceptable margin of the steering angle θ is small with respect to the vehicle speed V. In this case, the determination module 26 determines that a notification needs to be given to the operator.

If the plot point is located on the lower left side with respect to the margin curve C2, the determination module 26 determines that the acceptable margin of steering angle θ for the vehicle speed V is sufficient. In this case, the determination module 26 determines that the present state is normal.

The target curve C1 and the margin curve C2 are set by calculation, experiment, or the like, and are based on the premise that there is no load in the carrier 7 or the like, and that, for example, one operator of standard weight is on the vehicle. That is, the target curve C1 and the margin curve C2 are set based on values unique to the body. The target curve C1 and the margin curve C2 are stored in the storage medium of the controller 20.

Figure 5:
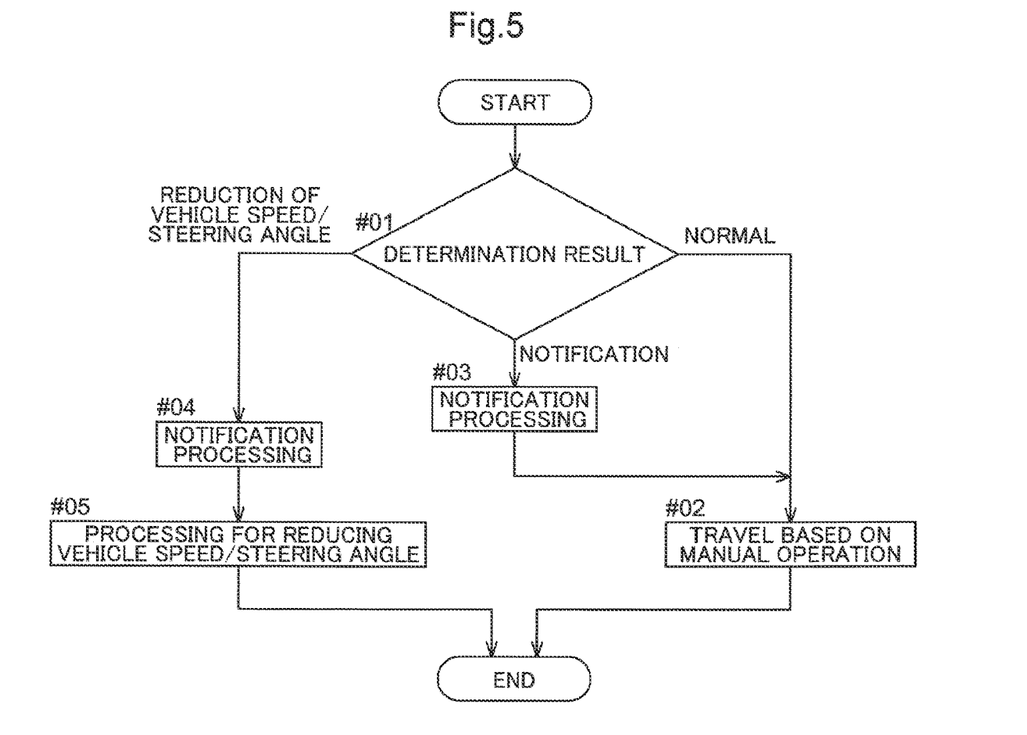
FIG. 5 is a flowchart illustrating processing performed after the determination module performs determination.

FIG. 5 shows processing performed after the determination by the determination module 26. If it is determined that the determination result is normal (step #01: normal), the travel control module 28 continues traveling based on a normal manual operation (step #02). When the determination result in the step #01 is "notification", it means that the vehicle speed V and the steering angle θ do not need to be reduced, but the operator is warned not to accelerate or further turn the steering wheel 6. If the determination result in step #01 is "notification", the determination result of the determination module 26 is sent to the notification module 27, and a signal related to a notification is sent from the notification module 27 to the notification apparatus 34. The operator is then warned by the notification apparatus 34 (step #03). Thus, the operator can take measures to suppress the roll of the traveling body 3 during turning travel.

If it is determined by the determination module 26 that at least either the vehicle speed V or the steering angle θ needs to be reduced (step #01: reduction of vehicle speed/steering angle), the determination result of the determination module 26 is sent to the notification module 27 and the travel control module 28. Next, a signal related to the notification is sent from the notification module 27 to the notification apparatus 34. Then, the notification apparatus 34 notifies the operator of information indicating that at least either the vehicle speed V or the steering angle θ needs to be reduced (step #04).

Further, the travel control module 28 is configured to execute processing for reducing the vehicle speed V (step #05) if the determination result in step #01 is "reduction of vehicle speed/steering angle". Specifically, the travel control module 28 lowers the upper limit of the rotational speed of the engine 11, reduces the engine speed of the engine 11, and/or increases the reduction ratio of the continuously variable shifter 13.

Furthermore, in step #05, the travel control module 28 is configured to restrain the steering wheel 6 from steering the front wheels 1. For example, there may be a case where the operator further turns the steering wheel 6 to the left or right side (to an opposite side to the straight-ahead driving side) with the centrifugal force acting on the traveling body 3 during turning travel toward the left or right side. In this case, a control signal is output from the travel control module 28 to the steering motor 33A, and the steering motor 33A generates a rotational torque in a opposite direction to the direction of the operator's turning operation. This rotational torque acts as resistance to the steering wheel 6, making the steering wheel 6 heavy when the operator turns the steering wheel 6 further to the left or right side. As a result, the operator is likely to have psychology to return the steering wheel 6 to the straight-ahead driving side or reduce the vehicle speed V.

The travel control module 28 is thus configured to perform processing for reducing the vehicle speed V and/or suppress steering of the steering wheel 6 if it is determined by the determination module 26 that at least either the vehicle speed V or the steering angle θ needs to be reduced. As a result, even if, for example, the operator has little driving experience, the configuration of the travel control module 28 assists the operator in comfortably driving the vehicle.

[Calculation of Height-of-Gravitational-Center, and Processing for Shifting Target Curve and Margin Curve]

As mentioned above, the target curve C1 and the margin curve C2 shown in FIG. 4 are set based on values unique to the body. The values unique to the body include a height-of-gravitational-center Gh, which indicates the gravity center in the vertical direction of the traveling body 3, and a height-of-gravitational-center Gh that is known based on the values unique to the body is stored as a "standard height-of-gravitational-center Gs" in the storage medium of the controller 20.

The height-of-gravitational-center Gh of the traveling body 3 varies depending on the load, optional components installed on the traveling body 3, the weight of the operator, the number of occupants, and so on. If the height-of-gravitational-center Gh of the traveling body 3 differs, the traveling body 3 has different roll characteristics even with the same vehicle speed V of turning travel. The height-of-gravitational-center Gh significantly affects the roll characteristics of the traveling body 3, but is an unknown value that can only be determined by actually performing turning travel. For this reason, the present preferred embodiment provides a configuration in which the height-of-gravitational-center Gh is calculated through actual turning travel, and the shapes of the curve shapes of the target curve C1 and the margin curve C2 change based on the height-of-gravitational-center Gh.

Figure 6:
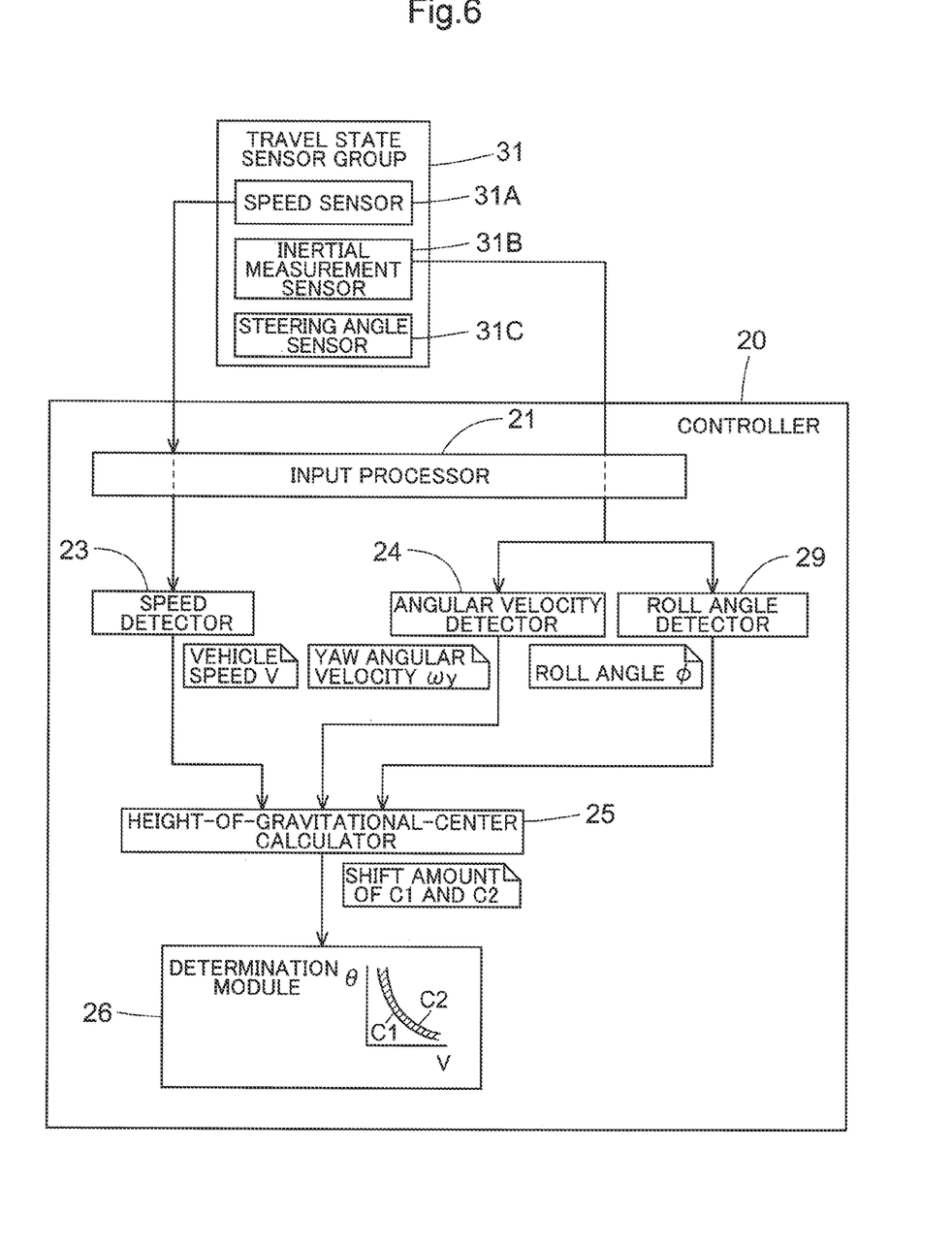
FIG. 6 is a control block diagram illustrating calculation of a shift amount based on a height-of-gravitational-center during a turning travel for calculation.

The calculation of the height-of-gravitational-center Gh and the change in the shapes of the target curve C1 and the margin curve C2 based on the height-of-gravitational-center Gh are performed based on processing illustrated in the block diagram in FIG. 6. The controller 20 shown in FIG. 6 includes an angular velocity detector 24, a roll angle detector 29, and a height-of-gravitational-center calculator 25. The height-of-gravitational-center calculator 25 corresponds to a "calculator" of the present invention.

The angular velocity detector 24 calculates a yaw angular velocity ωy of the traveling body 3 based on the angular velocity received from the inertial measurement sensor 31B. The calculated yaw angular velocity ωy is sent from the angular velocity detector 24 to the height-of-gravitational-center calculator 25. Note that the angular velocity detector 24 may also calculate a roll angular velocity ωr of the traveling body 3 and a pitch angular velocity ωp of the traveling body 3 in addition to the yaw angular velocity ωy. The roll angular velocity ωr is the amount of change in the roll angle φ per unit time, that is, an angular velocity around the roll axis. The pitch angular velocity ωp is an angular velocity around the pitch axis extending in the body left-right direction. The yaw angular velocity ωy is an angular velocity around a yaw axis extending in the body vertical direction.

The roll angle detector 29 calculates the roll angle φ of the traveling body 3 based on the detection value received from the inertial measurement sensor 31B. If the detection value is an angular velocity or an angular acceleration, the roll angle detector 29 calculates the roll angle φ by integrating this angular velocity or angular acceleration. The roll angle φ is an angle around the roll axis extending in the body front-back direction. The calculated roll angle φ is sent from the roll angle detector 29 to the height-of-gravitational-center calculator 25.

Figure 7:
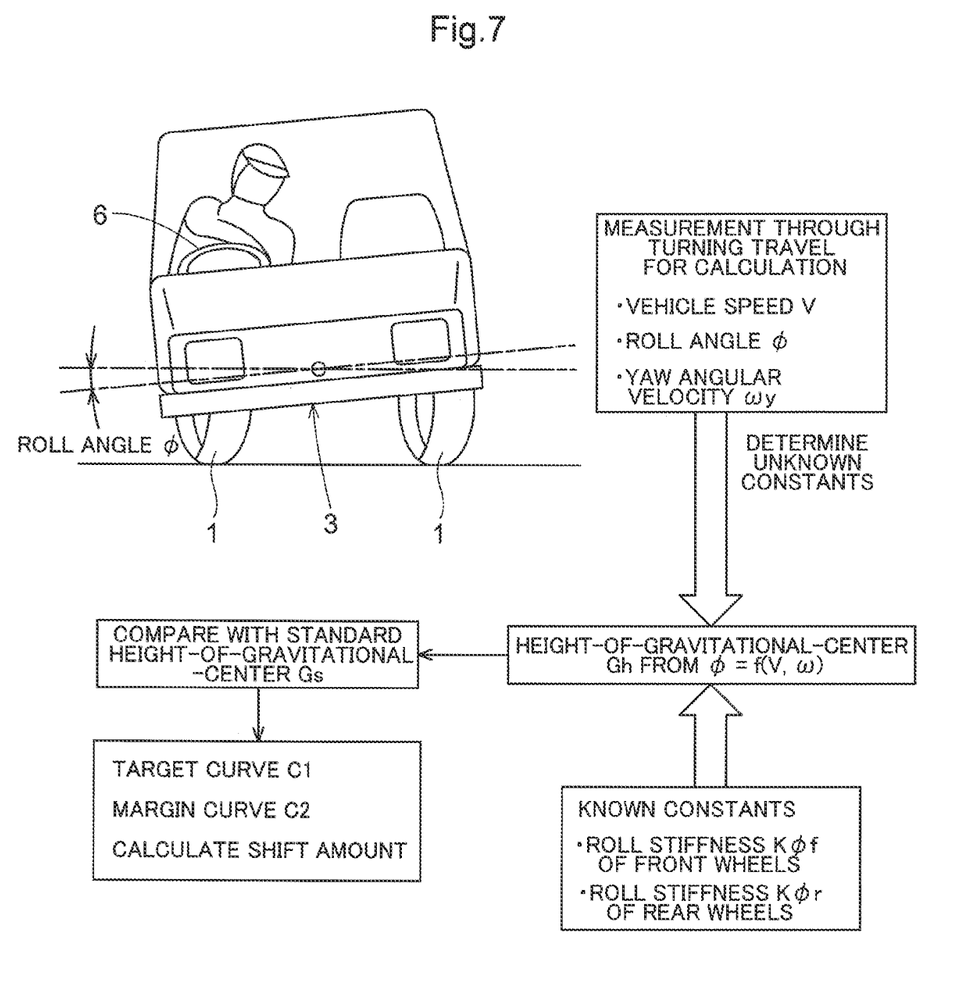
FIG. 7 illustrates the calculation of the height-of-gravitational-center during the turning travel for calculation.

The height-of-gravitational-center calculator 25 calculates the height-of-gravitational-center Gh by actual performing turning travel on a flat ground such as that shown in FIG. 7. This turning travel is referred to as "turning travel for calculation". The turning travel for calculation is test travel on a flat ground. In other words, the height-of-gravitational-center calculator 25 calculates the height-of-gravitational-center Gh based on the vehicle speed V, the roll angle φ, the yaw angular velocity ωy when the turning travel for calculation is performed on a flat ground. Note that there are cases where the height-of-gravitational-center calculator 25 calculates the height-of-gravitational-center Gh based on detection values of the roll angular velocity ωr, the pitch angular velocity ωp, or the like, in addition to the vehicle speed V, the roll angle φ, and the yaw angular velocity ωy.

The following function is used when the height-of-gravitational-center calculator 25 calculates the height-of-gravitational-center Gh.

$$\varphi = f(V, \omega)$$

In the function, φ denotes the roll angle φ, V denotes the vehicle speed V, and ω denotes the yaw angular velocity ωy.

Known constants of the function φ=f(V, ω) include a roll stiffness Kφf of the front wheels 1 and a roll stiffness Kφr of the rear wheels 2 (see FIG. 1). The roll stiffness Kφf of the front wheels 1 and the roll stiffness Kφr of the rear wheels 2 (see FIG. 1) are determined respectively by the spring constant of the suspension, the viscosity of shock absorber oil, or the like. That is, the height-of-gravitational-center calculator 25 calculates the height-of-gravitational-center Gh based on the roll stiffness Kφf of the front wheels 1 and the roll stiffness Kφr of the rear wheels 2.

The vehicle speed V is detected by the speed detector 23, and the steering angle θ is detected by the steering angle detector 30. In the turning travel for calculation, the vehicle speed V, the yaw angular velocity ωy, and the roll angle φ are measured, and the height-of-gravitational-center Gh is calculated based on these measured values.

Figure 8:
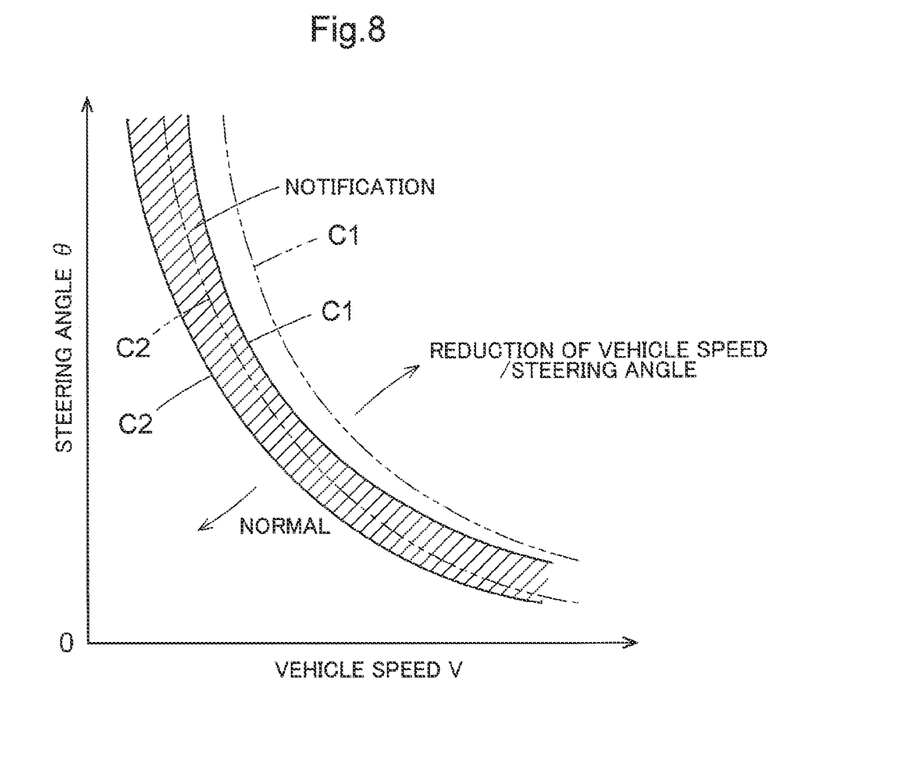
FIG. 8 is a graph showing that a target curve and a margin curve shift based on the height-of-gravitational-center.

After the height-of-gravitational-center Gh is calculated by the height-of-gravitational-center calculator 25 through the turning travel for calculation, the height-of-gravitational-center Gh is stored in the storage medium of the controller 20. The height-of-gravitational-center calculator 25 then calculates a difference between the height-of-gravitational-center Gh and the standard height-of-gravitational-center Gs, calculates a shift amount corresponding to the difference between the height-of-gravitational-center Gh and the standard height-of-gravitational-center Gs, and outputs the calculated shift amount to the determination module 26. The determination module 26 shifts the target curve C1 and the margin curve C2 toward the lower left side of the graph in accordance with the calculated shift amount. In other words, the determination module 26 shifts the target curve C1 and the margin curve C2 toward the side on which the vehicle speed V is lower and the steering angle θ is smaller, in accordance with the difference between the height-of-gravitational-center Gh and the standard height-of-gravitational-center Gs, as shown in FIG. 8. The determination module 26 then performs the aforementioned determination based on the shifted target curve C1 and margin curve C2. The greater the difference between the height-of-gravitational-center Gh and the standard height-of-gravitational-center Gs is, the greater the shift amount of the target curve C1 and the margin curve C2 becomes.

Thus, the height-of-gravitational-center calculator 25 calculates the actual height-of-gravitational-center Gh through the turning travel for calculation, and further calculates the shift amount of the target curve C1 and the margin curve C2 in accordance with the difference between the height-of-gravitational-center Gh and the standard height-of-gravitational-center Gs. The determination module 26 also shifts the target curve C1 and the margin curve C2 toward the side on which the vehicle speed V is lower and the steering angle θ is smaller, based on the shift amount calculated by the height-of-gravitational-center calculator 25. The turning travel for calculation may be performed only once before the start of practical travel, depending on, for example, prior travel plans, load carrying plans, plans for the number of occupants, or the like. To improve accuracy, the turning travel for calculation may be performed more than once with different speeds V and steering angles θ before the start of practical travel. Note that the turning travel for calculation may be 360° turning travel, or may be about 90° turning travel, or may be slalom travel or the like.

Figure 9:
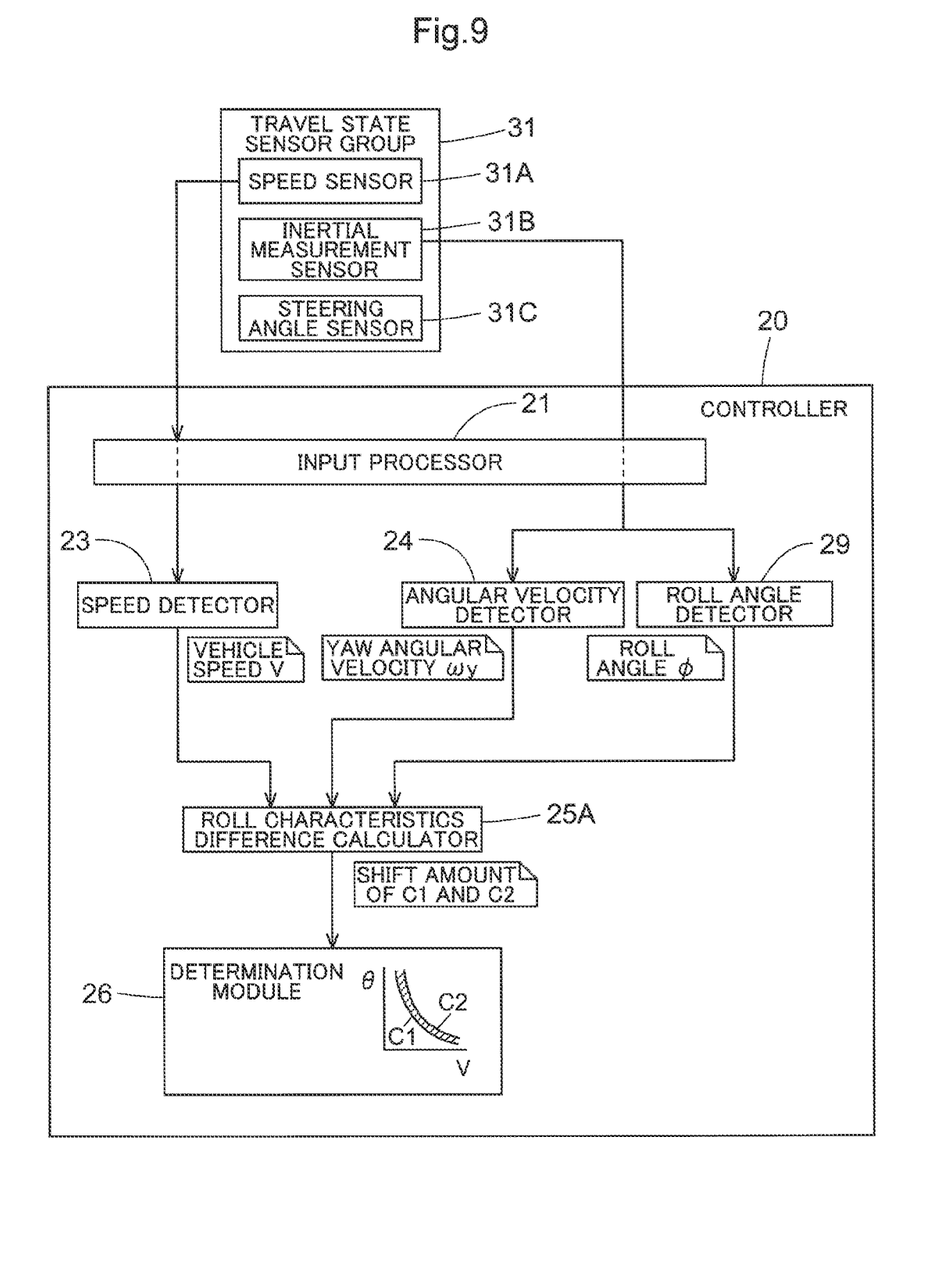
FIG. 9 is a control block diagram illustrating calculation of the shift amount based on roll characteristics during the turning travel for calculation.
Figure 10:
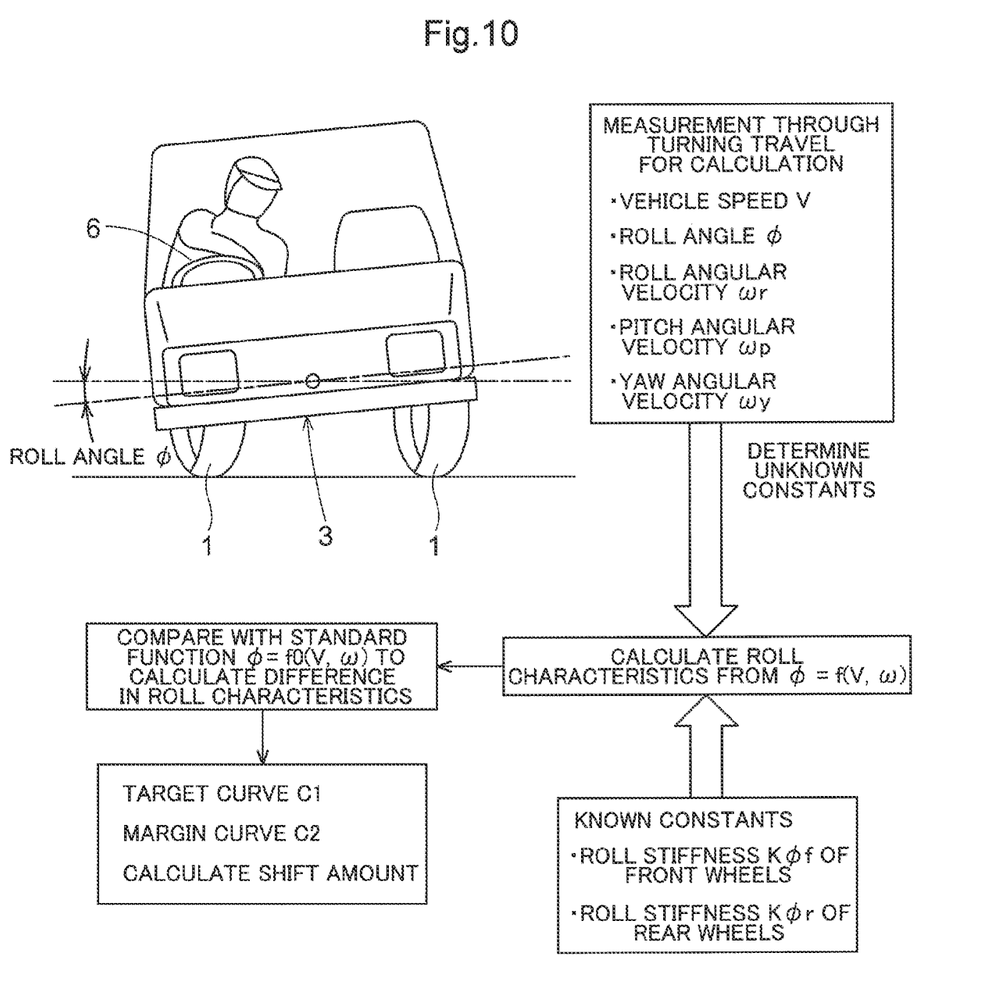
FIG. 10 illustrates the calculation of the shift amount during the turning travel for calculation.

In the above preferred embodiment, the height-of-gravitational-center Gh is calculated and the target curve C1 and the margin curve C2 are shifted by the height-of-gravitational-center calculator 25. However, the present invention is not limited to this preferred embodiment. If the optional components installed in the body, the weight of the operator, the number of occupants, or the like, changes, not only the height-of-gravitational-center Gh but also the position of the gravity center in the body left-right direction, the position of the gravity center in the body front-back direction, and the like, also change. Therefore, the position of the gravity center in the body left-right direction, the position of the gravity center in the body front-back direction, and the like, are also factors that affect the roll characteristics. The present invention also includes a configuration for performing processing for shifting the target curve C1 and the margin curve C2 (see FIG. 8) while comprehensively considering not only the height-of-gravitational-center Gh but also the position of the gravity center in the body left-right direction, the position of the gravity center in the body front-back direction, and the like. For this reason, the shift amount of the target curve C1 and the margin curve C2 may be calculated based on the difference in roll characteristics between the function φ=f(V, ω) of the roll characteristics obtained in the turning travel for calculation and the standard function φ=f0(V, ω), as shown in FIGS. 9 and 10. The standard function φ=f0(V, ω) of the roll characteristics is set by calculation, experiment, or the like, and is obtained with no load on the carrier 7 or the like, and with, for example, one operator of standard weight on the vehicle (a loading state of the traveling body 3). In this case, a roll characteristics difference calculator 25A is provided as shown in FIG. 9, instead of the height-of-gravitational-center calculator 25 shown in FIG. 6. The roll characteristics difference calculator 25A corresponds to the "calculator" of the present invention. The roll characteristics difference calculator 25A calculates a shift amount of the target curve C1 and the margin curve C2 based on the difference in the roll characteristics, and sends this shift amount to the determination module 26. The determination module 26 shifts the target curve C1 and the margin curve C2 toward the lower left side of the graph in accordance with the calculated shift amount.

Note that there are also cases where weight detection values at suspensions for the front wheels 1 and the rear wheels 2 and weight detection values at portions at which the weight frequently changes, such as the operator seat 5, the carrier 7, and hitch points (not shown), are used in the processing for shifting the target curve C1 and the margin curve C2.

Additional Preferred Embodiments

The present invention is not limited to the configuration described as an example in the above preferred embodiment. Other representative preferred embodiments of the present invention will be described below.

(1) The above preferred embodiment has described the front wheels 1 and the rear wheels 2 as a constituent of the traveling apparatus. However, the traveling apparatus may alternatively be of a crawler type, for example.

(2) In the above preferred embodiment, the engine 11 is provided as a constituent of the traveling apparatus. However, the engine 11 may alternatively be an electrical motor. In this case, in the vehicle speed control processing in step #05 in FIG. 5, the travel control module 28 may be configured to output a control signal to reduce the rotational speed of the motor. That is, the travel control module 28 may be configured to execute processing for controlling the vehicle speed of the traveling apparatus if it is determined by the determination module 26 that the tilt of the traveling body 3 (the centrifugal force acting on the traveling body 3) needs to be reduced.

(3) The turning travel for calculation in the above preferred embodiment is not limited to test travel, and may alternatively be daily turning travel on a flat ground, for example.

(4) The graphs shown in FIGS. 4 and 8 may alternatively be two-dimensional matrix tables in which the vehicle speed V and the steering angle θ are discretized (mesh partitioned), for example.

(5) In the above preferred embodiment, a multipurpose vehicle has been described as the work vehicle. However, the work vehicle may alternatively be a riding lawn mower, an agricultural machine such as a tractor, a construction machine such as a wheel loader, a snowmobile, a snow plow, or the like.

The present invention is applicable to work vehicles that has a traveling apparatus capable of turning travel of a body.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a body;
   a traveling apparatus capable of a turning travel;
   a speed detector capable of detecting a vehicle speed;
   a steering tool manually operable to steer the traveling apparatus;
   a notification apparatus;
   an angular velocity detector capable of detecting an angular velocity; and
   a controller configured or programmed to:
      cause a travel control module to control the traveling apparatus in response to a manual operation;
      cause a determination module to determine, based on a relationship between the vehicle speed and a steering angle of the steering tool, whether at least one of the vehicle speed and the steering angle needs to be reduced;
      cause a notification module to control the notification apparatus to give a notification of the determination by the determination module;
      cause a calculator to calculate roll characteristics of the body based on the angular velocity and the speed that are detected through a turning travel for calculation, which is a turning travel on a flat ground;
      cause the determination module to determine, based on the roll characteristics, whether at least one of the vehicle speed and the steering angle needs to be reduced; and
      cause the travel control module to execute vehicle speed control for reducing the vehicle speed of the traveling apparatus in response to the determination module determining that at least one of the vehicle speed and the steering angle needs to be reduced.

2. The work vehicle according to claim 1, wherein the angular velocity detected by the angular velocity detector includes at least one of an angular velocity of a roll angle of the body, an angular velocity of a yaw angle of the body, and an angular velocity of a pitch angle of the body.

3. The work vehicle according to claim 1, wherein the traveling apparatus comprises:
   a pair of left and right front wheels at a front part of the body; and
   a pair of left and right rear wheels at a rear part of the body, and
   wherein the controller is configured or programmed to:
   cause the calculator to calculate the roll characteristics based on at least one of a roll stiffness of the front wheels and a roll stiffness of the rear wheels.

4. The work vehicle according to claim 1, wherein the calculator is a height-of-gravitational-center calculator configured to calculate a height-of-gravitational-center as the roll characteristics based on the angular velocity and the vehicle speed detected through the turning travel for calculation.

5. The work vehicle according to claim 1, further comprising:
   a steering motor applying a torque to the steering tool, and
   wherein the controller is configured or programmed to:
   cause the travel control module to drive the steering motor so as to prevent the steering tool from being steered toward a side opposite to a straight-ahead driving side in response to the determination module determining that at least one of the vehicle speed and the steering angle needs to be reduced.

* * * * *